Patented Jan. 2, 1951

2,536,555

UNITED STATES PATENT OFFICE 2,536,555

PRINTING INK AND METHOD OF MAKING THE SAME

Vincent A. Lauderman, Hamilton, Ohio, assignor to The Champion Paper and Fibre Company, Hamilton, Ohio, a corporation of Ohio No Drawing. Original application July 10, 1945, Serial No. 604,301. Divided and this application March 30, 1949, Serial No. 84,490

6 Claims. (Cl. 106—24)

This invention relates to printing inks and more particularly concerns an improved water-base ink for use on printing presses.

The properties generally desired in letter-press inks include high tinctorial values, good wetting, spreading and transfer properties on the press, and stability in the sense of avoiding bacterial decomposition, hardening, "livering," settling out during storage, etc. Prior to the present invention, the only available printing inks combining these properties to the desired degree have been the better grades of oil base printing inks.

It is an object of the present invention to provide a water-base printing ink which possesses a stability as well as wetting, spreading, transferring and dispersing properties comparable with the better grades of oil base letter-press inks. Another object of the invention is to provide a water-base ink capable of forming solid coverages in deep colors and at the same time capable of printing fine half tones without squashing and filling up. A further object of the invention is to provide a water-base ink containing casein or an equivalent protein adhesive which will keep indefinitely without spoilage.

The objects of the invention also include a method for preparing a water-base ink of the character indicated. Other objects will be apparent from the following description.

The preferred inks of the present invention are essentially alkaline casein-rosin dispersions of an insoluble pigment in an aqueous solution of urea, usually containing a suitable hygroscopic agent which may be a polyhydric alcohol such as ethylene glycol, glycerine, sorbitol or the like. In place of the rosin, other naturally occurring resinous materials may be employed such as shellac, damar, copal, sandarac, and the like, but in general, rosin, either as such or as ester gum or as a modified rosin, is most satisfactory. For convenience I will herein designate the various resinous ingredients of this sort as "natural resins."

In preparing these inks, it is advantageous to first heat the natural resin and the hygroscopic agent, e. g. ethylene glycol, until the natural resin, e. g. rosin is melted. To this solution is added a solution of caustic soda or other alkali. A casein solution made by dissolving casein in alkali is prepared and the natural resin and casein solutions are mixed together. Ordinarily, the amount of natural resin employed is considerably in excess of the casein. To the mixed solutions is added urea in large excess over the amount of casein used. Finally a pigment is added and the whole mass is put through an ink mill.

This alkaline natural resin-casein combination as herein employed forms an excellent base for the other ingredients of the ink. It prevents "livering" of the ink, a condition which commonly occurs when either ingredient alone is used in water-base inks. It disperses most pigments more perfectly than either agent alone and it firmly bonds the pigment to the paper. Moreover, it appears to bring about a perfect blending of the urea and hygroscopic agent to produce a homogeneous vehicle excellently adapted for the incorporation of a wide variety of known pigments.

Although casein inks are notoriously prone to bacterial spoilage, the presence of the natural resin renders these inks permanently stable. Other protein adhesives such as soy bean protein may be substituted for the casein in many cases.

The relative proportions of pigment, natural resin, and protein adhesive to be used may vary over a wide range depending on the particular pigment and resin employed, the tack, consistency, and other properties desired for any given requirement. Thus I have obtained satisfactory results using from 3 to 40 parts of casein and from 3 to 100 parts of rosin per 100 parts of pigment (by weight).

If desired a suitable soap, e. g., sodium oleate may be incorporated into the ink.

The urea or equivalent substance is an essential ingredient since in combination with the casein and natural resin it greatly improves the wetting, spreading and transfer properties of the ink on the press and thus enables a more perfect application of the ink to the surface to be printed. Ordinarily from 2 to 7 times as much urea as casein is used, but somewhat larger or smaller amounts can sometimes be employed.

The total solids of the ink may be varied over a fairly wide range, depending on the particular consistency most desired for any particular job. I have obtained good results with inks of from 54% to 83% total solids. These inks have the consistency of thicker or thinner pastes just as in the case of oil base letter-press inks. If desired a much thinner ink suitable for rotogravure printing may be prepared by reducing the total solids to any required degree.

My improved inks always show an alkaline reaction, commonly having a pH of from about 7.0 to about 9.0. Above a pH of 9.0 there is a tendency for the natural resin to separate out from the ink. It has been my experience that inks of this type commonly have optimum wetting and transfer properties at a pH of about 8.5 with most pigments.

Certain examples of inks embodying the invention and the process of preparing such inks will now be given.

*Example 1*

Sixty grams of water white rosin were added to 61 grams of ethylene glycol and the mixture was heated until the rosin had melted and dissolved in the glycol. Then a solution containing 6.75 grams of sodium hydroxide and 6.75 grams of water was added. A casein solution was prepared by warming 25 grams of casein, 55 grams of water, and 3 grams of a 33⅓% solution of sodium hydroxide. The two solutions were then mixed and 125 grams of urea were stirred in until it was dissolved. One hundred grams of tungstated Victoria Blue toner were then added and the whole mixture thoroughly incorporated in an ink mill. This ink had a pH of 8.3 and had a consistency of good letter press printing ink. It behaved very well on the printing press and gave excellent printing results.

*Example 2*

Sixty grams of water white rosin, 30 grams of oleic acid, and 54 grams of ethylene glycol were heated together. Then 25 cc. of a 50% solution of sodium hydroxide were added. A casein solution was prepared by warming 25 grams of casein, 5 grams of water, and 3 grams of a 33⅓% solution of sodium hydroxide. The two solutions were then mixed and 67.5 grams urea were stirred in. Then 200 grams of Para Red pigment were thoroughly incorporated in the mixture by means of an ink mill. This ink had a pH of 8.4 and had the consistency of a good letter-press printing ink. It handled well on the printing press and printed excellently.

It will be understood that the invention is not limited to the details of the foregoing examples except insofar as recited in the appended claims.

This application is a division of my copending application Ser. No. 604,301, filed July 10, 1945, now Patent No. 2,468,633.

I claim:

1. A water-base printing ink having the consistency of letter-press oil-base ink consisting, in parts by weight, of 100 parts of pigment dispersed in an alkaline aqueous vehicle comprising from about 3 to 40 parts of an alkali-dispersible protein, from about 3 to 100 parts of a natural resin, and urea in an amount from about 2 to 7 times the amount of protein, said ink having a pH of from 7 to 9.

2. A water-base printing ink having the consistency of letter-press oil-base ink consisting, in parts by weight, of 100 parts of pigment dispersed in an aqueous alkaline vehicle comprising from about 3 to 40 parts of casein, from about 3 to 100 parts of a natural resin, a polyhydric alcohol, and urea in an amount from about 2 to 7 times the amount of casein, said ink having a pH from about 7 to 9.

3. A water-base printing ink having good spreading and transfer properties consisting, in parts by weight, of 100 parts of pigment dispersed in an aqueous alkaline vehicle comprising from about 3 to 40 parts of casein, from about 3 to 100 parts of rosin, ethylene glycol, and urea in an amount from about 2 to 7 times the amount of casein, said ink being of the consistency of a paste and having a pH of about 8.5.

4. A water-base printing ink having the consistency of letter-press oil-base ink consisting, in parts by weight, of 100 parts of pigment dispersed in an aqueous alkaline vehicle comprising from about 3 to 40 parts of casein, from about 3 to 100 parts of rosin, a soap, ethylene glycol, and urea in an amount from about 2 to 7 times the amount of casein, said ink having a pH of about 8.5.

5. A process of preparing a printing ink which comprises heating together from about 3 to 100 parts of a natural resin and about an equal amount of a polyhydric alcohol until said resin dissolves in said alcohol, adding an alkali thereto, dissolving from about 3 to 40 parts of an alkali-dispersible protein with alkali to form an aqueous alkaline solution, mixing the two solutions together, adding urea thereto in an amount from about 2 to 7 times the amount of protein, and thereafter dispersing 100 parts of pigment in the mixture, the amount of alkali added in toto being sufficient to impart to the ink a pH of from 7 to 9.

6. A process of preparing a water-base printing ink which comprises heating together from about 3 to 100 parts of rosin and about an equal amount of ethylene glycol until the rosin dissolves in the glycol, adding an alkali thereto, dissolving from about 3 to 40 parts of casein with alkali to form an aqueous alkaline casein solution, mixing the two solutions together, adding urea thereto in an amount from about 2 to 7 times the amount of casein, and thereafter dispersing 100 parts of pigment in the mixture, the amount of alkali added in toto being sufficient to impart to the ink a pH of from 7 to 9.

VINCENT A. LAUDERMAN.

REFERENCES CITED

The following references are of record in the file of this patent:

UNITED STATES PATENTS

| Number | Name | Date |
| --- | --- | --- |
| 422,430 | McCloskey et al. | Mar. 4, 1890 |
| 1,621,532 | Hopkins | Mar. 22, 1927 |
| 1,962,823 | Kurz | June 12, 1934 |
| 1,971,522 | Dunham | Aug. 28, 1934 |
| 2,358,511 | Hopkins | Sept. 19, 1944 |
| 2,468,633 | Lauderman | Apr. 26, 1949 |
| 2,482,879 | Schmutzler | Sept. 27, 1949 |

Certificate of Correction

Patent No. 2,536,555 January 2, 1951

VINCENT A. LAUDERMAN

It is hereby certified that error appears in the printed specification of the above numbered patent requiring correction as follows:

Column 3, line 33, for "5 grams" read *54 grams*; column 4, line 57, list of references cited, for patent number "1,621,532" read *1,621,542*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*